(No Model.) 2 Sheets—Sheet 1.

C. K. WELCH.
PNEUMATIC TIRE AND RIM FOR WHEELS.

No. 580,069. Patented Apr. 6, 1897.

Witnesses:
Raphaël Netter
James N. Catlow

Inventor
Charles K. Welch
by Duncan & Page.
Attorneys.

(No Model.) 2 Sheets—Sheet 2.
C. K. WELCH.
PNEUMATIC TIRE AND RIM FOR WHEELS.
No. 580,069. Patented Apr. 6, 1897.
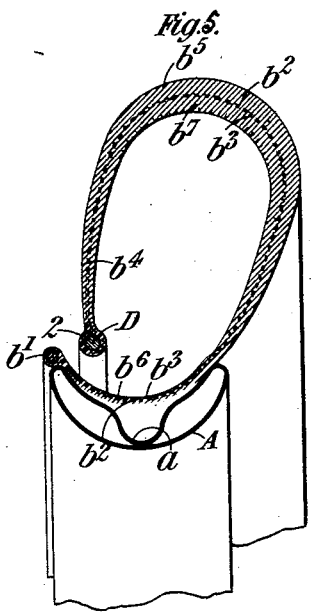
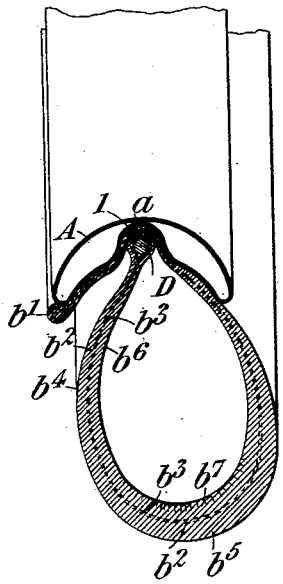
Witnesses:
Raphael Netter
James N. Catlow.
Inventor
Charles K. Welch
by Duncan & Page
Attorneys.

UNITED STATES PATENT OFFICE.

CHARLES KINGSTON WELCH, OF COVENTRY, ENGLAND, ASSIGNOR TO THE PNEUMATIC TYRE COMPANY, LIMITED, OF DUBLIN, IRELAND.

PNEUMATIC TIRE AND RIM FOR WHEELS.

SPECIFICATION forming part of Letters Patent No. 580,069, dated April 6, 1897.

Application filed August 7, 1894. Serial No. 519,631. (No model.) Patented in England December 8, 1893, No. 23,689; in France July 7, 1894, No. 239,882; in Belgium July 7, 1894, No. 110,865; in Italy July 15, 1894, XXIX, 36,859, and LXXII, 254; in Switzerland July 17, 1894, No. 8,985; in Denmark July 21, 1894, No. 169, and in Canada September 5, 1894, No. 46,985.

*To all whom it may concern:*

Be it known that I, CHARLES KINGSTON WELCH, engineer, a subject of the Queen of Great Britain, residing at Coventry, England, have invented certain new and useful Improvements in and Relating to Pneumatic Tires and Rims for Wheels, of which the following is a specification, reference being had to the accompanying drawings.

I have obtained patents for this invention in the following countries, to wit: Great Britain, No. 23,689, dated December 8, 1893; France, No. 239,882, dated July 7, 1894; Belgium, No. 110,865, dated July 7, 1894; Denmark, No. 169, dated July 21, 1894; Italy, Vol. XXIX, No. 36,859, and Vol. LXXII, No. 254, dated July 15, 1894; Switzerland, No. 8,985, dated July 17, 1894, and Canada, No. 46,985, dated September 5, 1894.

My invention relates to pneumatic tires and rims for bicycle and other wheels, and has for its object to provide an improved means for securing such tires to the rims, which means involve a novel construction both of the tires themselves and of the rims with which they are associated.

As these improvements reside in details of construction by which the tire is held to the rim, I shall describe them in detail by reference to the accompanying drawings.

Figure 1:
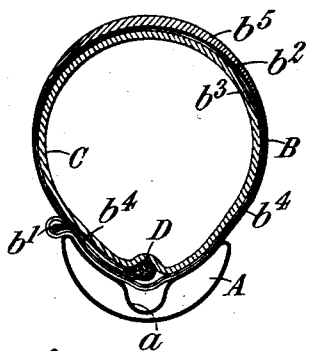
Figures 2, 3:
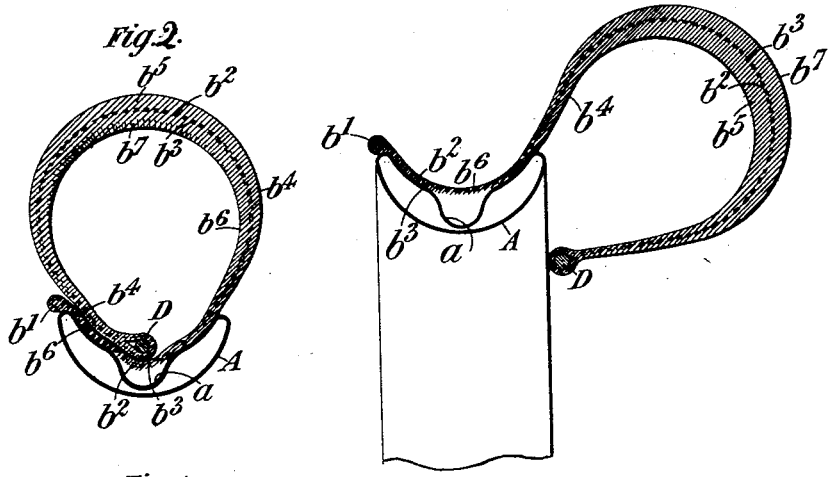
Figure 4:
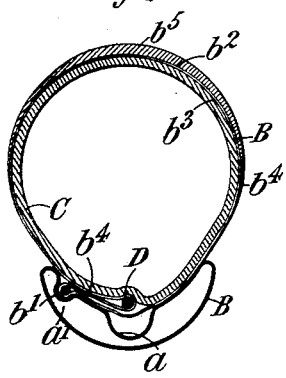
Figure 6:
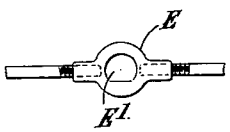

Figure 1 is a sectional view of a tire secured to the rim of the wheel in accordance with my invention. Fig. 2 is a similar view of a modified form of tire. Fig. 3 is a sectional view showing the normal shape of a tire-cover such as illustrated in Fig. 1. Fig. 4 is a view similar to Fig. 1, showing a modified form of rim. Fig. 5 is a view illustrating the method of attaching and detaching my improved tire. Fig. 6 is a view showing a plate for joining the ends of a wire to form an endless core.

A is a rim.

B is the tire-cover.

C is the air-tube, and D is the endless core.

The rim may be solid or hollow, and in all cases has a groove or channel $a$ at or near the center thereof.

One of the edges of the cover B has secured to it an endless inextensible core D and the other edge of the cover is provided with a lip $b'$ or thickened by the insertion of a core of gutta-percha, india-rubber, or ordinary cord or wire or other suitable material. A very suitable method of making such a cover is as follows, that is to say: A strip of canvas is doubled, the core D being inclosed in the fold, and the other edge of the canvas is then rolled up to form the lip $b'$. The canvas, which is in two layers, as shown by the dotted lines $b^2$ $b^3$ in Fig. 1, is then covered on the side which will ultimately form the outside of the tire with a layer of india-rubber $b^4$. Said india-rubber layer is preferably thickened at that part of the cover which comes in contact with the ground, as shown at $b^5$, and may be omitted where the cover comes in contact with the rim A.

In Fig. 1 I show the tire fitted with a separate air-tube C; but I may dispense with such air-tube, in which case I preferably line the cover inside with a layer of rubber $b^6$, as shown in Fig. 2. Such inner layer of rubber is preferably continuous with the outer layer, passing quite around the core D, and I sometimes arrange that the rubber on the inside should not only be thicker at that part near the tread, but also be in a state of compression, which is denoted by the short radial lines shown in the drawings. In order to produce this state of compression, the tire-cover is molded with a curvature in the reverse direction to that which it will have when in position on the wheel-rim, the natural position which such a cover would tend to take being shown in Fig. 3. It will be seen from a comparison of Figs. 2 and 3 that the rubber part (marked $b^7$) is curved in the opposite direction in Fig. 2 to that in Fig. 3. Hence it must be in a state of compression, as shown by the radial lines in Fig. 2, as the canvas $b^2$ $b^3$ is outside it in Fig. 4 and inside it in Fig. 3.

I sometimes provide an auxiliary groove $a'$ near one edge of the rim, as shown in Fig. 4.

The lip $b'$ can then be placed in such groove instead of being outside the rim. This groove may be, if desired, narrower at its mouth than it is inside—that is to say, approximately of a dovetail section.

In placing such a tire as shown on the rim the part of the cover near to the thickened edge $b'$ is first slipped over the rim. Then the air-tube, when such is used, is placed outside that part of the cover adjacent to the rim. The remaining part of the cover is wrapped around until the edge containing the endless core is resting on the wheel-rim above the groove inclosing the air-tube when such is used.

To get the endless core into position on the rim, a portion of the circumference thereof is placed in the groove in the bottom of the said rim, as shown at the place marked 1, Fig. 5, and that part of the circumference of the core on the opposite side of the wheel is slipped over the edge, as shown at 2 in Fig. 5. The core is by this means readily brought to its proper position. When the air-tube is inflated, the two edges of the cover are pressed tightly against the rim, that part of the cover adjacent to the rim being prevented from slipping out by means of its lip or thickened edge $b'$ and the other side of the cover being held in place by its inextensible core.

When I dispense with the air-tube, as shown in Fig. 2, I prepare the edges of the cover, by solution or otherwise, so that when pressed together they form an air-tight joint. For this purpose said edges may be covered with rubber having a smooth surface, and the said edges may be corrugated longitudinally, if desired. Instead of using solution which makes a practically permanent joint I very often introduce a viscid liquid, preferably of a resinous nature, at the joint when first inflating the tire, so as to prevent the air escaping therefrom. When, however, the tire is fully inflated, the pressure of the air within presses the two edges so closely in contact that an air-tight joint is made. Such a tire can obviously be very readily repaired by deflating the same and then opening the joint and placing a patch on the inside.

Instead of providing one edge of the tire with a lip or thickened part $b'$, I may permanently secure that edge to the wheel-rim by any suitable means. Said edge may be lapped around on the outside of the rim, if desired.

The tires hereinabove described, used with or without an interior air-tube, may be made in such a manner that when in place on the wheel the material is in compression, as hereinabove described, or they may be made of canvas, silk, or other fabric lined with any suitable air-proof coating. Such a coating is preferably made of a solution of viscid natural gum or the like which does not dry and which will flow together and be readily closed or be self-closing after puncture.

I sometimes make the jacket of an endless or seamless band of fabric cut from a tube of approximately the same diameter as the wheel-rim.

The inextensible core which I use for attaching the tire to the rim is preferably made endless by brazing or otherwise uniting the ends of said core by a plate pierced with a suitable hole. Such a plate E is shown in Fig. 6. The valve-spindle is put through the hole E' and assists in maintaining the core in place. Said core may be made of a spiral wire, if desired, or of any suitable metal or material, and covered or not with canvas or gutta-percha or other substance.

In the case of a tire having one edge secured to the rim I preferably secure the valve to one side instead of in the middle of the rim. Said valve may be permanently secured to the rim when the tire is used without a separate air-tube.

The rim may be made solid or hollow by any of the methods now commonly known and practiced or I may use a wooden rim. Said rim may be of any suitable shape, provided that the center thereof is of smaller diameter than the edges.

By my invention I am enabled to make, if desired, a very light and resilient tire which can be, moreover, very readily repaired when necessary. These tires can also be made suitable for use with heavy vehicles.

What I now claim is—

1. The combination of a wheel-rim having a central groove or depression, a pneumatic tire which is not permanently tubular and is furnished with an endless wire ring or core in each of its edges, one core being arranged to engage or to lock with one side of the rim so as to be retained centrally with regard to the axis of the wheel and the other core being arranged centrally in the rim or immediately opposite the central groove or depression, the two edges of the tire overlapping each other, substantially as described.

2. The combination of a wheel-rim having a central groove or depression, a pneumatic tire which is not permanently tubular and is furnished with an endless wire ring or core in each of its edges, one core being arranged to engage or to lock with one side of the rim so as to be retained centrally with regard to the axis of the wheel and the other core being arranged centrally in the rim, or immediately opposite the central groove or depression, the two edges of the tire overlapping each other, and a viscid substance introduced between the edges of the tire to prevent leakage of air, substantially as described.

3. The combination of a wheel-rim having a central groove or depression, a pneumatic tire which is not permanently tubular and is furnished with an endless wire ring or core in each of its edges one core being arranged to engage or to lock with one side of the rim so as to be retained centrally with regard to the axis of the wheel and the other core being arranged centrally in the rim or immediately opposite the central groove or depression, the two edges of the tire overlapping each other, and a separate air-tube within the tire, substantially as described.

4. The combination of a wheel-rim having a central groove or depression, a pneumatic tire which is not permanently tubular and is furnished with an endless wire ring or core in each of its edges, one core being arranged to engage or to lock with the extreme edge of the rim so as to be retained centrally with regard to the axis of the wheel and the other core being arranged centrally in the rim or immediately opposite the central groove or depression, the two edges of the tire overlapping each other, substantially as described.

In witness whereof I have hereunto set my hand this 24th day of July, 1894.

CHARLES KINGSTON WELCH.

Witnesses:
T. J. MALONEY,
FINLAY SINCLAIR.